United States Patent
Haytayan

(10) Patent No.: US 7,316,056 B2
(45) Date of Patent: Jan. 8, 2008

(54) METHOD FOR ANCHORING WOOD FLOORS

(76) Inventor: Harry M. Haytayan, 32 Indian Rock Rd., Nashua, NH (US) 03063

( * ) Notice: Subject to any disclaimer, the term of this patent is extended or adjusted under 35 U.S.C. 154(b) by 741 days.

(21) Appl. No.: 10/663,973

(22) Filed: Sep. 16, 2003

(65) Prior Publication Data

US 2004/0098927 A1 May 27, 2004

Related U.S. Application Data

(63) Continuation-in-part of application No. 10/301,262, filed on Nov. 21, 2002, now abandoned.

(51) Int. Cl.
  *B23P 11/00* (2006.01)
  *E04H 12/00* (2006.01)
(52) U.S. Cl. ............................. 29/432; 52/40
(58) Field of Classification Search .................. 29/432, 29/428; 52/480, 393, 403.1, 508
See application file for complete search history.

(56) References Cited

U.S. PATENT DOCUMENTS

| | | | |
|---|---|---|---|
| 3,511,001 A * | 5/1970 | Morgan, Jr. | ................ 52/126.5 |
| 3,512,446 A | 5/1970 | Sekhon | |
| 3,828,422 A | 8/1974 | Schmitt | |
| 4,202,242 A | 5/1980 | Champoux et al. | |
| 5,388,380 A | 2/1995 | Niese | |
| 5,412,917 A * | 5/1995 | Shelton | ..................... 52/403.1 |
| 5,609,000 A | 3/1997 | Niese | |
| 5,645,208 A | 7/1997 | Haytayan | |
| 5,785,478 A | 7/1998 | Rotter | |
| 5,927,035 A | 7/1999 | Haytayan | |
| 6,282,848 B1 * | 9/2001 | Schlapfer | ..................... 52/79.1 |
| 6,367,217 B1 | 4/2002 | Niese et al. | |

* cited by examiner

*Primary Examiner*—John C Hong
(74) *Attorney, Agent, or Firm*—Pandiscio & Pandiscio

(57) ABSTRACT

An improved method for anchoring to a concrete base a wood floor attachment member having top and bottom sides, a number of passthrough holes, and compressible pads attached to its bottom side. The method uses pointed fasteners having radially projecting heads and sleeves that are inserted in the passthrough holes. Each sleeve has an annular flange at its proximal end that overlies the attachment member and its center bore has a counterbore at the proximal end. The method also comprises use of a fastener driver having a nozzle sized to enter said sleeve counterbore but not said center bore, a hammer bore for receiving a fastener, and a hammer in the nozzle bore that is powered to engage the fastener head and drive the fastener into locking engagement with the base via said center bore, whereby to fix the sleeve surrounding the fastener, and the floor attachment member, to the base.

10 Claims, 8 Drawing Sheets

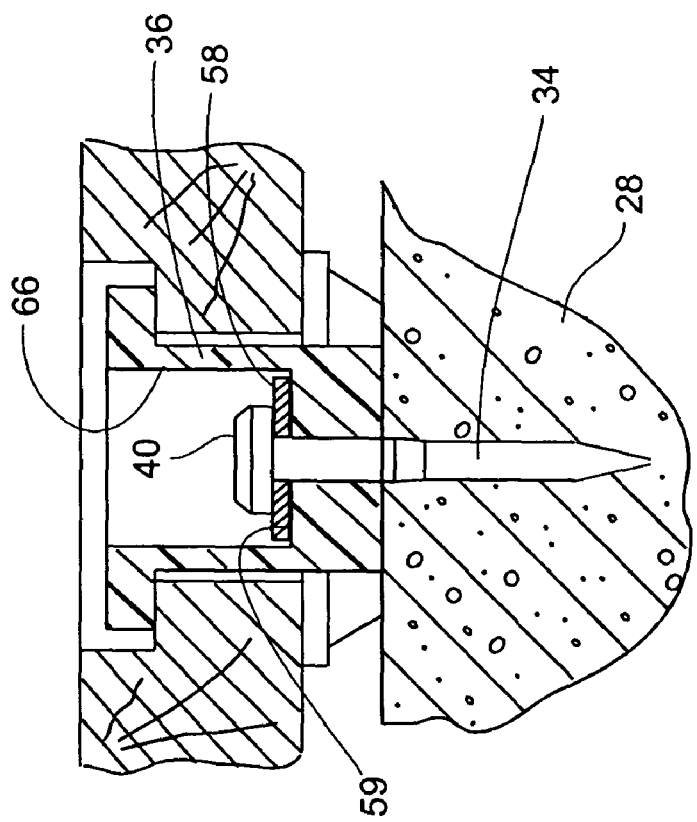
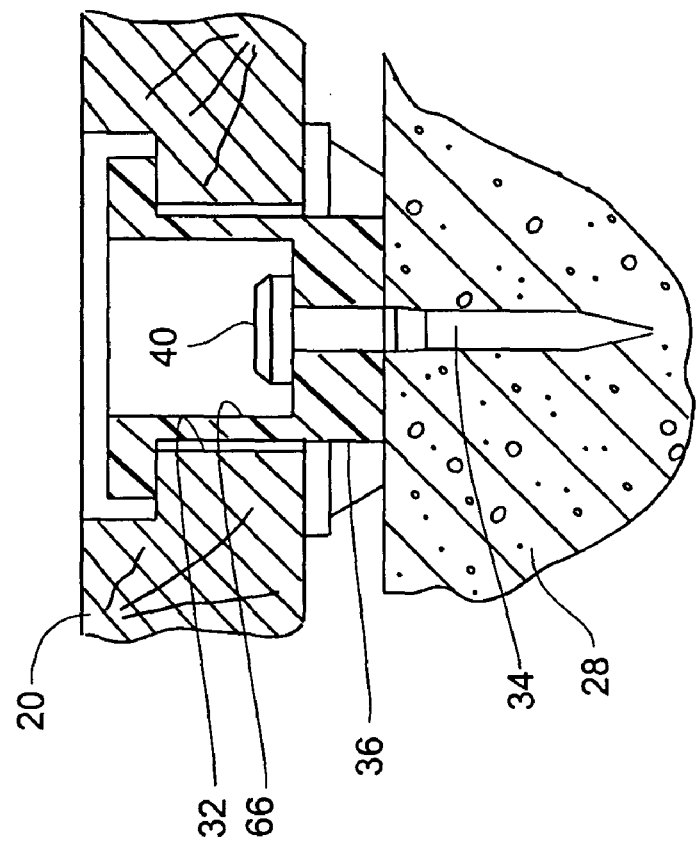

METHOD FOR ANCHORING WOOD FLOORS

CROSS REFERENCE TO RELATED APPLICATION

This is a continuation-in-part of application Ser. No. 10/301,262, filed Nov. 21, 2002 now abandoned, in the name of Harry M. Haytayan, incorporated herein by reference.

FIELD OF THE INVENTION

This invention relates to the installation of wood floors and more particularly to an improved fastening system for anchoring such floors to a base made of concrete or like material.

BACKGROUND OF THE INVENTION

Wood floor systems used for sports, such as basketball, require a significant degree of cushioning or impact absorption of the floor relative to the underlying base of concrete or like material to which it is secured in order to reduce injuries. Accordingly, a number of different floor systems have been designed to provide appropriate floor deflection and resiliency. Such floor systems typically include a plurality of hardwood floorboards, one or more subfloor layers supporting the floorboards, and a plurality of elastomeric pads attached to and underlying the subfloor layer(s) for supporting the floor system on a base, usually in the form of a concrete or asphalt slab. In some cases, the base may be a pre-existing wood floor. The floor system is anchored to the base by metal fasteners in such a way as not to precompress the elastomeric pads when the floor system is in an unloaded state and leaving a gap of free space between the subfloor(s) and the base with the vertical dimension of that space being such as to allow downward deflection of the floor under impact, thereby providing shock absorption and resiliency or "give", and reducing the amount of reaction force imparted by the floor system to the impacting person or object.

The free space provided between the subfloor layers and the base is also important with respect to reducing the effect of humidity changes on the dimensional stability of the wood components. Wood components are susceptible to absorption and expulsion of moisture, with a resultant expansion and contraction. The effect of humidity changes on the dimensional stability of the floor system is reduced by the free space inasmuch as the latter limits moisture transfer between the base and the supported components.

A number of different floor systems are known that are designed to provide some degree of impact absorption and are characterized by free space between the base and the subfloor layers. One of those systems is disclosed in U.S. Pat. No. RE37,615, issued Apr. 2, 2002 to Michael W. Niese for "Anchored/Resilient Hardwood Floor System". The disclosure of that patent is incorporated herein by reference.

In the construction disclosed and claimed in U.S. Pat. No. RE37,615, a plurality of mutually spaced sleepers 20 (FIGS. 1 and 2) in the form of elongated nailing members are used with a subfloor layer 22 for supporting a layer of hardwood floorboards 24 that serve as a wear surface. One or more of the subfloor layers 22 are interposed between the sleepers 20 and the hardwood wear surface 24. The sleepers 20 also include compressible supporting pads 26, e.g., pads made of a suitable elastomer. In the floor system disclosed in the aforesaid patent, a fastening arrangement 30 is used to secure the sleepers 20 directly to a base 28 so that (a) the pads 26 are not precompressed, i.e., the pads are not compressed beyond the compression that results solely from the weight of the flooring system components carried by the pads, and (b) the sleepers 20 can deflect downwardly upon impact to the upper layer of the floor system but are restricted against upward movement beyond the initial static position of the pads. The fastening arrangement 30 includes holes 32 with counterbores 44 in the sleepers 20, floor-anchoring fasteners 34 with heads 40 that extend through the counterbored holes 32 into the base 28, and means 36 for limiting the depth of penetration of the fasteners 34 into the base 28 so that the downward driving forces applied via the fasteners do not precompress the elastomer pads 26. As disclosed in U.S. Pat. No. RE37615, cited supra, the means 36 comprises a cylindrical plastic lubricating sleeve 36 which may but need not have an integral flange 42 (as shown in FIG. 9 of the patent) or be used with a separately formed flange in the form of a circular washer (FIG. 1). Counterbore 44 is sized to accommodate fastener head 40 and also flange 42. U.S. Pat .No. RE37615 teaches that the sleeve 36 may be made of Teflon or any other low friction material.

Floor systems similar to the type shown and described in U.S. Pat. No. RE37,615 are in commercial use. The foregoing patent indicates that the floor system disclosed therein may be anchored by forcing the fasteners 34 into predrilled holes 38 in the base 28 or by driving the fasteners into the base using a nail gun without any pre-drilled holes. However, as a practical matter prior to this invention it was not feasible or practical to anchor the sleepers to a concrete base without first predrilling holes for the fasteners in the concrete. Instead, the usual practice has been to predrill holes in the concrete base and use fasteners that are characterized by a shoulder that functions as a depth stop and an expansion curve adjacent the leading end for anchoring the fasteners in the concrete base, with the fasteners being surrounded by plastic lubricating sleeves that sit loosely in the counterbored holes and serve to reduce friction between the fasteners and the sleepers, as illustrated in FIG. 9 of U.S. Pat. No. RE37,615. Typically, the lubricating sleeve has a peripheral flange at its top end and the flange portion has a counterbore to accommodate the head of the fastener. The fasteners are driven into the predrilled holes by manually impacting them with a hammer.

Manually driving a fastener into dense concrete without predrilling a hole to accommodate the fastener cannot be done, or at least not without having to strike each fastener repeatedly. However, the holding power of a fastener driven into solid concrete by repeated blows is unsatisfactory. When a fastener is impacted with sufficient force to penetrate a concrete substrate, a so-called "ball" is formed in the concrete around the leading end of the fastener. That ball is a densification of the concrete which exerts a tight grip on the fastener. However, if thereafter the embedded fastener is impacted one or more times, the ball will be disrupted and even disintegrate, with the result that the concrete's grip on the fastener is weakened substantially. It is well known in the structural fastening field that the same phenomenon occurs when impact driving a fastener into a steel substrate. Therefore, to maximize the holding power, a fastener should not be hit more than once when impact driven into concrete or steel.

Heretofore powered impact-type drivers have been used for driving fasteners into concrete or other hard masonry substrates for the purpose of anchoring metal components to the substrates. However, prior to this invention use of power drivers for anchoring the sleepers disclosed in U.S. Pat. No.

RE37,615 was not feasible. The primary problem stems from the counterbored holes 32 in the sleepers 20. The counterbored holes 32 are designed to accommodate heads 40 of the fasteners 34 so they will not protrude above the sleepers where they can interfere with the subfloor members 22 carried by the sleepers, particularly when the floor system is deflected downwardly under impact. The counterbores 44 serve to provide a recessed seat for the flanges 42.

However, the requirement that the heads 40 of the fasteners (and also the flanges 42 of the lubricating sleeves 36 when used) be recessed in the counterbored holes 32 has made it difficult to use a power driver. The need to recess the heads of the fasteners in the counterbored holes 32 complicates attainment of the requirement that the striker or hammer of the power driver be able to drive the fasteners deep enough to assure a tight engagement of the fastener heads (or the flanges of the lubricating sleeves) with the bottoms of the counterbores, but not so deep as to preload the resilient pads 26. The counterbored holes 32 also make it difficult to center the striker or hammer of the powered driver on the fastener head, which is an important consideration since optimum performance of the driver requires that its striker be readily centered on the fastener head and the driver be positioned to drive the fastener perpendicularly to the base 28. This centering problem is complicated by the fact that in actual practice the lubricating sleeves 36 are sized to make a loose fit in the counterbored holes. Another factor discouraging against use of a power driver is the requirement that the action of the driver not interfere with the use of fastener depth stop means designed to prevent compression of the resilient pads, as those disclosed in U.S. Pat. No. RE37,615.

Because of these problems, there has been lacking a satisfactory and reliable way to secure the sleepers of the form disclosed in the aforesaid patent to a concrete base without using pre-drilled holes for the fasteners. The need to predrill holes introduces a variety of limitations, the most significant of which is that installation of such systems is slow and costly due to the manual labor consumed in predrilling holes in the concrete and the need to precisely locate the holes to assure alignment with the counterbored holes in the sleepers, and the repeated hammering action required to seat the fastener.

One solution that has been advanced is described in my copending application Ser. No. 10/301,262, cited supra. The invention described in that application constitutes a substantial improvement over the prior art in that it facilitates use of a power driver. The present invention constitutes an improvement over the invention disclosed in my copending application Ser. No. 10/301,262.

OBJECTS AND SUMMARY OF THE INVENTION

The primary object of this invention is to improve upon the invention disclosed in my copending application Ser. No. 10/301,262.

Another object of this invention is to provide an improved fastening system and method for anchoring a wood floor to a concrete base with fasteners, without the need for predrilling holes for the fasteners.

A more specific object is to provide an improved fastening system and method for anchoring to a concrete base floor assembly sleepers of the type that have counterbored holes to accommodate fasteners.

Another object is to provide a novel and improved fastening system arrangement for anchoring hardwood floors.

A further object is to provide a novel and improved fastener arrangement comprising a fastener and a hard plastic standoff sleeve for the fastener, the sleeve being adapted to withstand fracture by the fastener when the fastener is impacted by the hammer of a power driver.

The foregoing and other objects of the invention are achieved by providing a fastening system including a sleeve and fastener arrangement for anchoring a sleeper of the type described hereinabove to a concrete base, and a power driver for driving the fastener into the concrete base. The sleeves are sized to fit loosely in counterbored holes preformed in the sleeper. Each sleeve has a center bore for accommodating the shank of the fastener, a larger bore for receiving a nozzle of a power driver, and a peripheral flange at its top end that is sized to fit within the sleeper counterbore. Also, in relation to the associated fastener, the sleeve has an effective length that enables the sleeve to function as a depth stop that prevents the fastener from pre-compressing resilient pads of the sleeper. Each fastener has a radially projecting head at its top end. The fasteners are driven into the concrete base by means of a power driver provided with a nozzle sized to fit within the larger bore in the sleeve and a hammer bore that is sized to accept the head of a fastener disposed in one of the sleeve center bores, whereby the hammer of the driver will be aligned with the head of the fastener, and the tool will be oriented perpendicularly to the sleeper, as required for optimum driving of the fastener into concrete. The sleeves function as a depth stop to prevent or limit preloading of the resilient pads on the bottom of the sleeper by the driven fasteners. The drive stroke of the driver's hammer may be limited so as to permit the hammer to drive the fastener to a depth that is sufficient to secure the sleeper to the concrete base, but not so far as to overload the resilient pads or damage the sleeve.

In accordance with a further feature of the invention, there is provided a fastening system and method for anchoring wood floors to a supporting base. The system comprises a fastener having a shank, a pointed distal end, and a proximal head end having an enlarged diameter head with a flat proximal surface, a sleeve for retaining floor assembly structural members to the base, the sleeve having a central bore therethrough, a countersink extending from a proximal end of the sleeve coaxially with the central bore, and an annular flange extending outwardly from the sleeve proximal end. The system further comprises a driver for driving the fastener through the sleeve countersink and the sleeve bore into the supporting base. The driver comprises a nozzle having a bore for receiving the fastener, with the nozzle being adapted to enter the sleeve countersink. The driver further comprises a hammer movably disposed in the nozzle bore and movable to engage the flat surface of the head of the fastener and to drive the fastener into locking engagement with the base, whereby to fix the sleeve to the base, and thereby anchor the floor assembly structural members to the base.

Other features and advantages of the invention are set forth in or rendered obvious by the following detailed description which is to be considered together with the drawings.

THE DRAWINGS

FIG. 9 is a sectional view in elevation showing a sleeve and fastener after the fastener has been driven into a floor-supporting base;

FIG. 10 is similar to FIG. 9, but illustrative of an alternative embodiment;

DETAILED DESCRIPTION OF THE INVENTION

Figure 2:
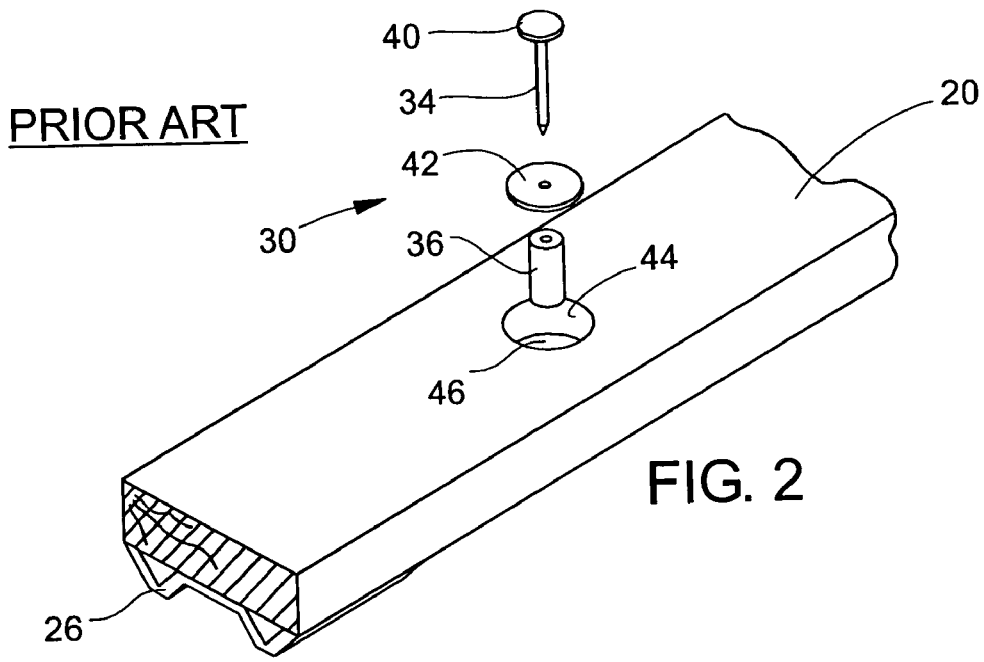
FIG. 2 is an exploded perspective view of the same floor system.
Figure 1:
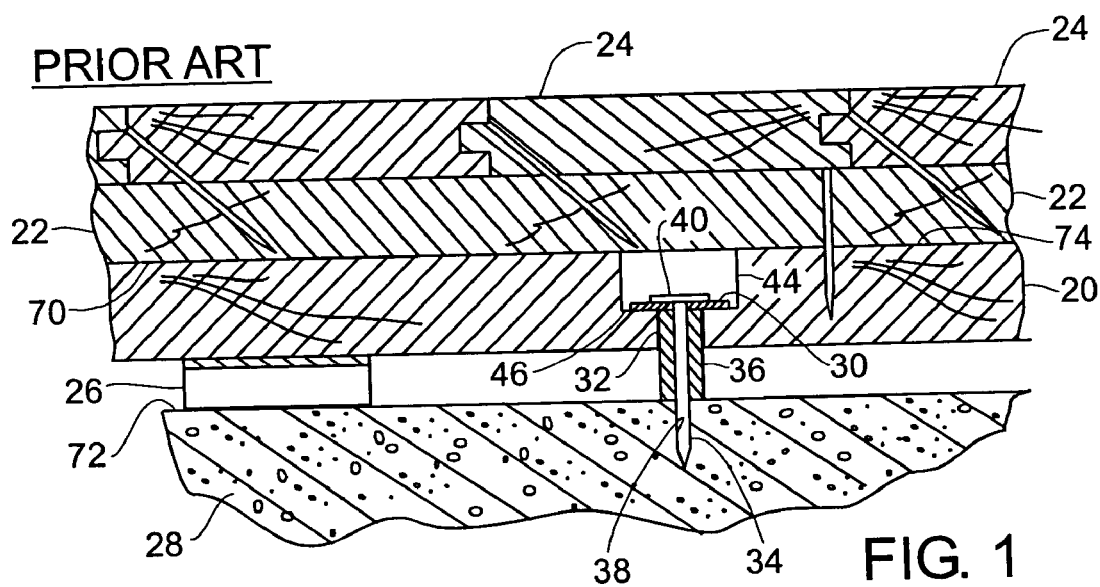
FIG. 1 is a cross-sectional view of a known sleeper-type flooring system.
Figure 3:
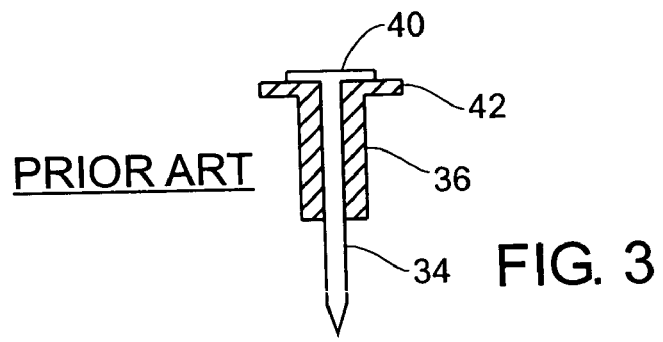
FIG. 3 is a partly sectional partly elevational view of a fastener and sleeve arrangement for use in the flooring system of FIGS. 1 and 2.

FIGS. 1-3 illustrate a section of a floor system of the type disclosed in U.S. Pat. No. RE37,615. The floor system comprises a plurality of mutually spaced attachment members in the form of the wooden sleepers 20 having the resilient pads 26 on their bottom sides and supporting at least one subfloor layer 22 on their top sides. The subfloor layers are secured to the sleepers by nails or other fasteners 34. The sleepers 20 are anchored to and supported by the base 28, typically formed of concrete. Overlying the subfloor layer 22 is the wood floor 24 which usually is made up of interlocked tongue and groove maple floorboards that are anchored to the subfloors by fasteners 25. The subfloor layer(s) 22 may take various forms, e.g., as disclosed in U.S. Pat. No. RE37,615 and the prior art listed therein. Typically, the subfloor layer 22 is formed of 4'×8' plywood panels and has a uniform thickness of about ½ inch. The sleepers 20 typically have a cross-sectional height of about 1.5 inch, and a width of about 2.5 inch, and a length of either 4 or 8 feet. The sleepers are usually spaced apart about 12 inches, although that spacing may vary depending upon their width. The foregoing dimensions are not critical, and hence sleepers having a different height, width, length and spacing may be used.

The pads 26 are molded from an elastomeric material in order to provide resiliency, vibration dampening and shock absorption for the floor system. The pads may take various shapes without affecting the invention. Thus, for example, the pads may be as illustrated in U.S. Pat. No. 5,388,380, issued Feb. 14, 1995 to Michael W. Niese and U.S. Pat. No. 6,367,217, issued Apr. 9, 2002 to Michael W. Niese et al. The pads may be solid or may be formed with hollow internal volumes or spaces to better permit the pads to deflect in the vertical direction immediately upon impact to the wood floorboards 24. The pads are sized to provide a space of predetermined minimum height between the sleepers and the supporting base, typically a height in the range of about 0.5 to about 0.75 inch, under the static weight of the floor system.

Each of the sleeper members 20 is provided with at least one, and usually two or more of the through holes 32 to accommodate the fasteners 34 and sleeves 36. A counterbore 44 is coaxial with each hole 32 on the top side of the sleeper, so that each hole has a relatively small diameter bottom section and a relatively large diameter top section 44. The bottom end of each counter bore has a flat annular surface 46.

Figure 5:
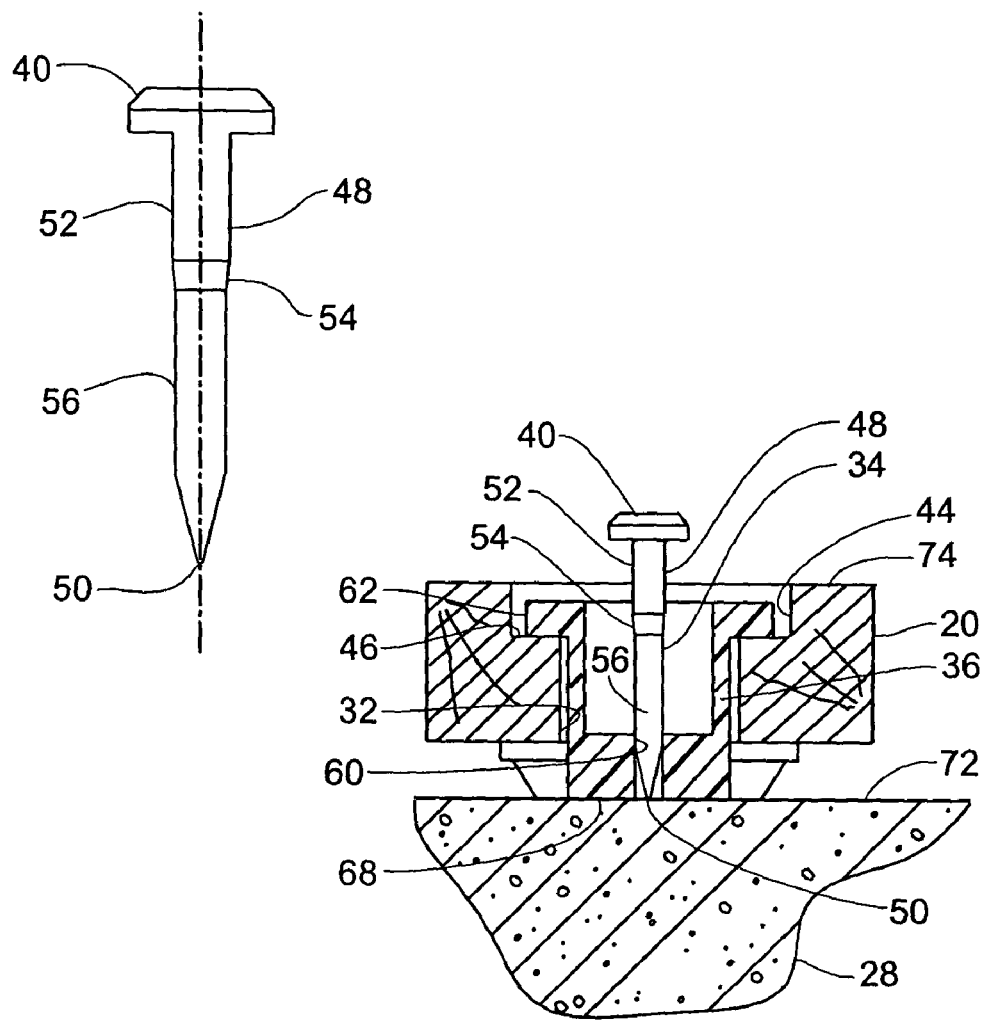
FIG. 5 is a sectional view illustrating the sleeve and fastener of FIG. 4 in ready position for a fastening operation.
Figure 4:
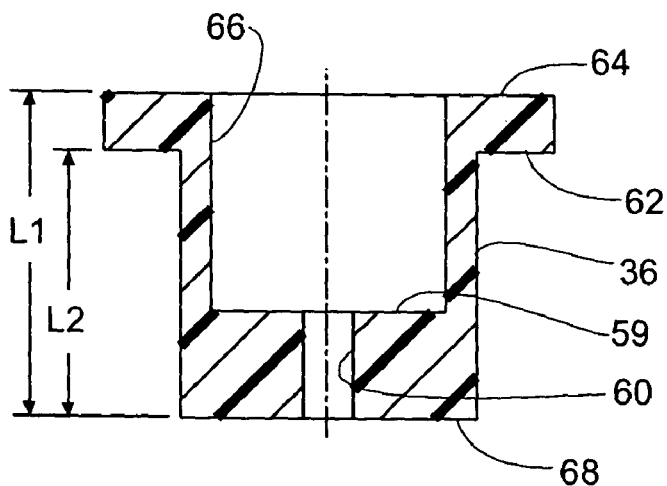
FIG. 4 is a an exploded view, partly in elevation and partly in section, of a preferred form of fastener and sleeve provided according to the present invention.

Referring to FIGS. 4 and 5, it will be seen that according to this invention, the fasteners 34 are essentially nails, being formed with a head 40 having a flat top surface and a shank 48 that has a pointed tip 50. Preferably, the shank 48 is stepped so as to provide a relatively large diameter upper or trailing section 52 and a relatively small diameter lower or leading section 56, with a short tapered transition section 54. By way of example but not limitation, the fastener 34 may have an overall length of about 1⅜-1½ inch, a head diameter of about ½ inch and a head thickness of about 0.150 inch, a transition section 54 length of approximately ⅛ inch and diameters of 0.200 inch and 0.190 inch for shank sections 52 and 56 respectively. The larger diameter section 52 serves to provide column strength to the fastener so that it will not buckle when it is impacted against the concrete base by the powered driver, described hereinafter. The smaller diameter section 56 and its pointed tip 50 facilitate piercing of the dense concrete, and the tapered transition section 54 facilitates penetration of the concrete by the leading end of trailing shank section 52. It is preferred, but not essential, that the shank section 56 have a plurality of shallow helical grooves (not shown herein, but shown in FIG. 6 of my aforementioned application Ser. No. 10/301, 262,) located rearwardly of the point tip 50, to facilitate penetration of the dense concrete under the impact force of a powered driver according to this invention. In order to assure penetration without bending, the fasteners are preferably made of an alloy or special high carbon steel and heat treated to HRc 53/56 hardness.

Still referring to FIGS. 4 and 5, the sleeves 36 may be made of various materials. Preferably, they are made of a high density plastic such as Delrin® or a high impact plastic such as a high density polyethylene. The sleeves 36 are of a cylindrical shape and are characterized by a center bore 60, and a peripheral flange 62 at one end 64, herein referred to as the top end. Additionally, each sleeve 36 has a counterbore 66 for bore 60 at its top end 64 to serve as a countersink for the top end of the fastener. The height of the flange 62, i.e., its dimension measured longitudinally of the sleeve, is less than the depth of the sleeper counterbore 44. The length of the sleeve 36 is such that the sleeve projects through the sleeper 20 and into engagement with the concrete base 28, while the sleeve flange 62 engages the upper surface 72 of the base 28.

More specifically the overall length L1 of the sleeve 36 is less than the distance between a bottom surface 70 (FIG. 1) of the subfloor 22 and an upper surface 72 of the base 28 after the floor system has been anchored to the base without precompressing the pads 26. Also, the length of the portion of each sleeve between flange 62 and its bottom end surface 68, represented as L2 in FIG. 4, is equal to the combined vertical distance between the annular bottom surface 46 of sleeper counterbore 44 and the upper surface 72 of base 28 after the floor has been anchored to the base without precompressing the pads 26. The outside diameters of each sleeve 36 and its flange 62 are sized so as to provide a clearance with the sleeper holes 32 and its counterbore 44 respectively. Such clearance is desired to allow the sleepers and the supported flooring members to move vertically under changing loads and also to avoid squeaking due to friction when the flooring members move vertically. Preferably the clearances are between about 0.040 and about 0.060 inch.

According to the preferred mode of practicing the invention (hereinafter the "automatic mode"), only the sleeves are pre-positioned in the sleeper holes 32 and the nails are fed from a magazine attached to the powered driver that is used to drive the fastener into the underlying base, as described hereinafter However, it is contemplated that the sleeves 36 and the fasteners 34 may be pre-positioned manually in the counterbored sleeper holes 32, with the powered driver then being used to drive the fasteners into the underlying base (hereinafter the "manual mode").

In the manual mode, the fasteners 34 may be pre-assembled to the sleeves 36 before the sleeves are inserted into sleeper holes 32 or each fastener may be inserted into a sleeve after the sleeve has been inserted into a sleeper hole. If the invention is practiced in the manual mode, the driver may but need not have a fastener-carrying magazine, in which case the nozzle 82 does not have the side entry port 88 for fasteners. In view of the manual mode option, the sleeves 36 may be formed with the diameter of center bore 60 equal to the diameter of shank portion 56. With this size arrangement (which is suitable for the automatic as well as the manual mode of operation), when the fastener 34 is pre-positioned within the sleeve 36 as required for the manual mode, its shank section 56 will be gripped by surface-to-surface contact with the sleeve in bore 60, with the result that the fastener will be held straight (i.e. coaxial with the sleeve) in the manner illustrated in FIGS. 5 and 8, thereby facilitating driving of the fastener by the powered driver.

Figure 8:
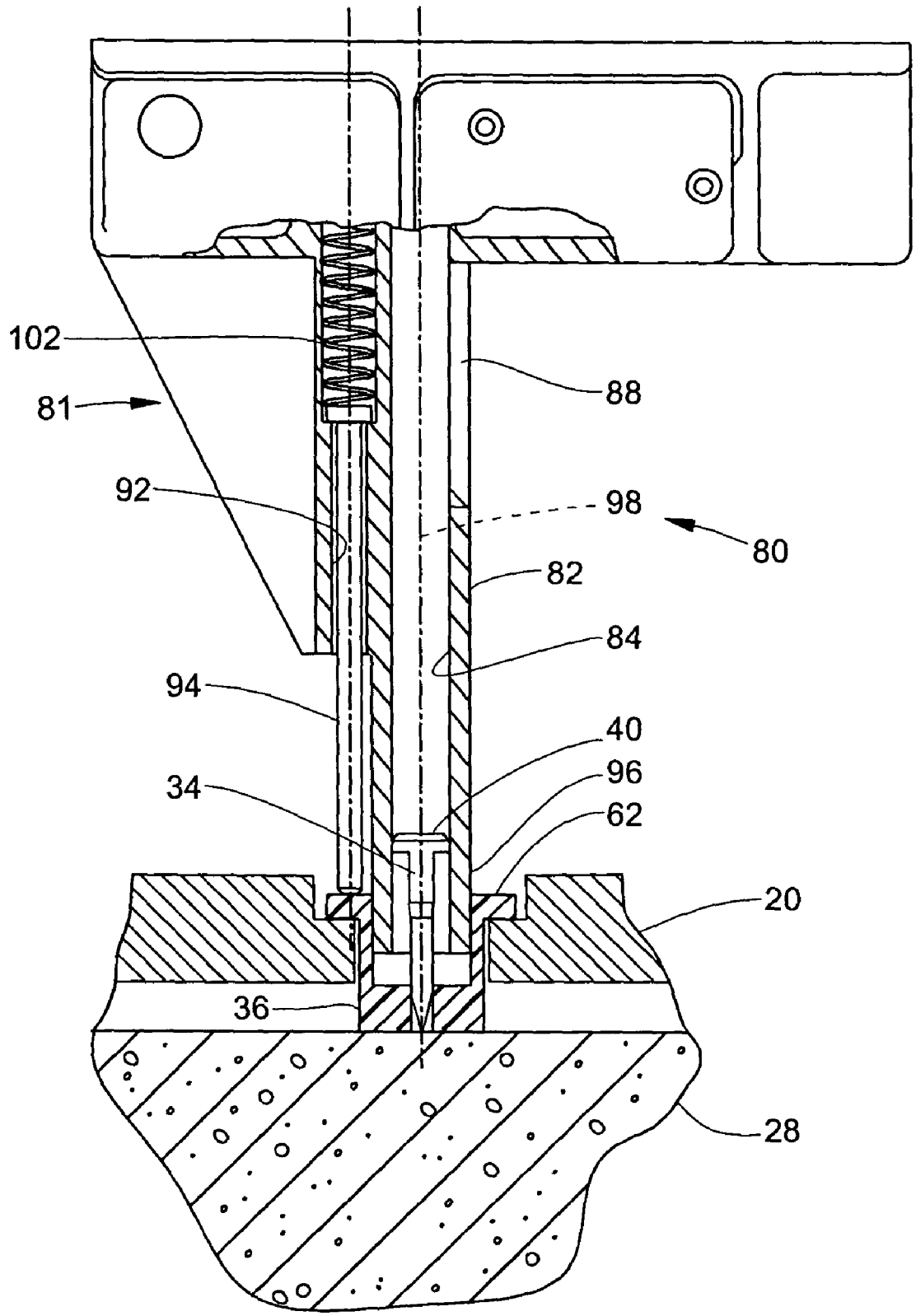
FIG. 8 is a side elevational, partly sectional, partly broken-away view illustrating the nozzle of the driving tool of FIG. 7, a fastener and fastener-receiving sleeve in relation to a floor system that is to be anchored by the fastener and sleeve.

Further with respect to the manual mode of operation, the sleeve and fastener are sized so that when the sleeve 36 is inserted in a sleeper hole 32 with its flange 62 resting on the bottom surface 46 of sleeper counterbore 44, and a fastener is inserted in the sleeve, the head 40 and a substantial portion of the shank portion 52 of the fastener project above the upper surface of the sleeper, in the manner shown in FIGS. 5 and 8, thereby facilitating alignment of the driver nozzle with sleeve and fastener. As a minimum, at least the head 40 of the fastener should project above the upper surface 74 of the sleeper 20 in order to facilitate alignment of the powered driver used to propel the fastener into the concrete base 28. It also is preferred that the fastener 34 and sleeve 36 be sized so that when the fastener is inserted into and gripped by the sleeve, the pointed tip 50 of the fastener is even with, or just short of being even with, the bottom end surface 68 of the sleeve.

Figure 6:
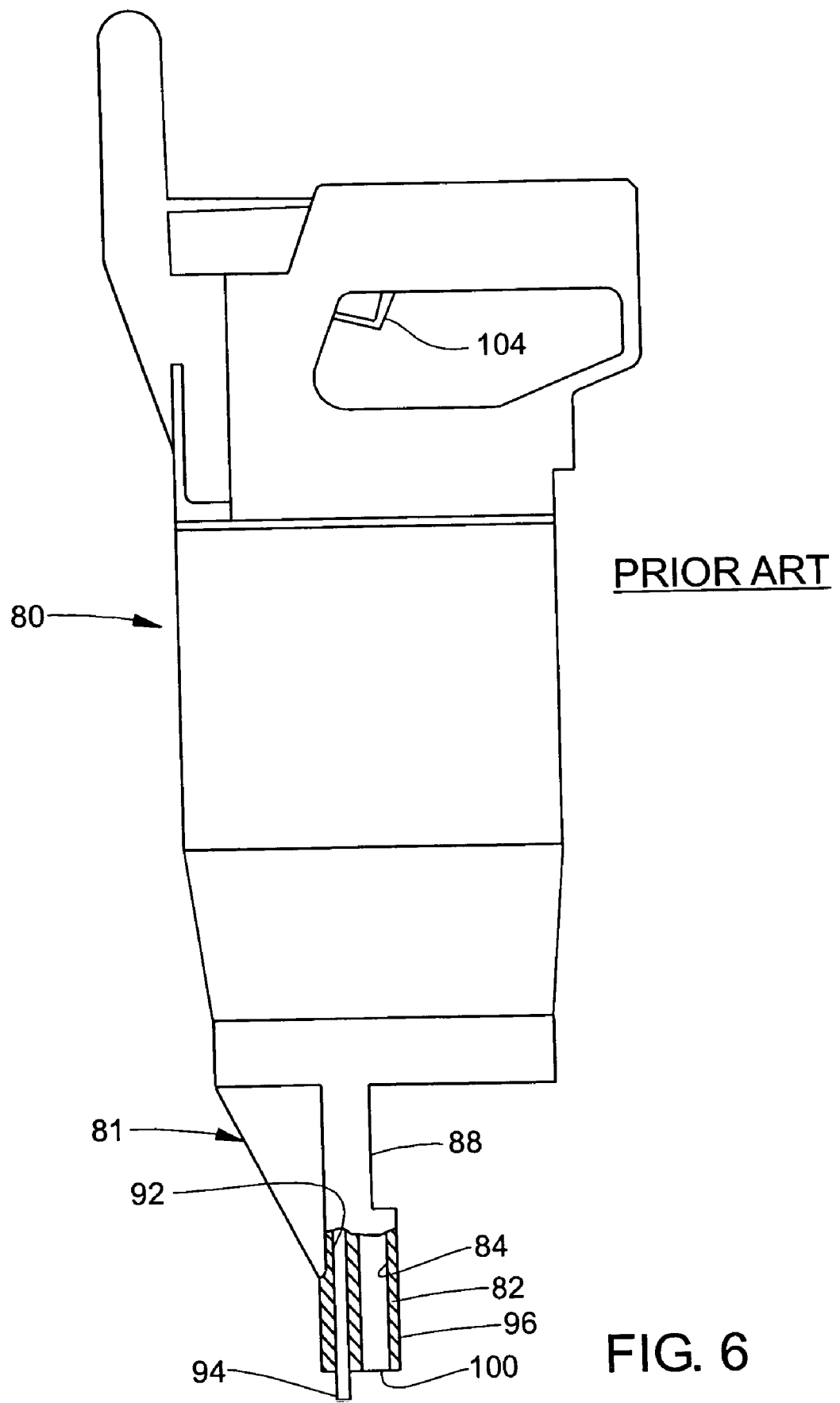
FIG. 6 is a side elevational, partly sectional view showing a known fastener driving tool.

A suitable form of powered driver is disclosed in U.S. Pat. No. 5,645,208, issued Jul. 8, 1997 to Harry M. Haytayan for "Pneumatic Fastening Tool With Safety Interlock". The disclosure of that patent is incorporated herein by reference. FIG. 6 disclosed a driver 80 as disclosed in the patent. That driver includes a bottom member 81 that comprises a nozzle 82 having an axially-extending bore 84 that accommodates a hammer 86 (see FIG. 7), which also is identified by persons skilled in the art as a "striker"), (2) a side entry port 88 for fasteners 34 carried in strip form by a magazine (see magazine 90 in FIG. 7) that is attached to the nozzle member, and (3) a second axially-extending bore 92 that accommodates a spring-biased valve-actuating safety rod 94. The bore 92 is formed in a portion of the wall of nozzle 82 that surrounds and defines bore 84. Bore 92 extends through and in non-concentric relation with the bottom end face 100 of the nozzle. As shown in FIG. 6, safety rod 94 normally projects out of the bottom end face 100 of nozzle 82. Such a driver device is capable of driving fasteners into concrete with a single impact without any predrilling, with the fasteners having a holding power in the concrete in excess of 1000 lbs., partly as a result of a well-known ball phenomenon described in my copending application Ser. No. 10/301,262, cited supra. Pneumatic drivers embodying the design disclosed in U.S. Pat. No. 5,645,208 are available commercially from Pneutek, Inc. of Hudson, N.H. One such driver is Pneutek Model PT 1100.

Figure 7:
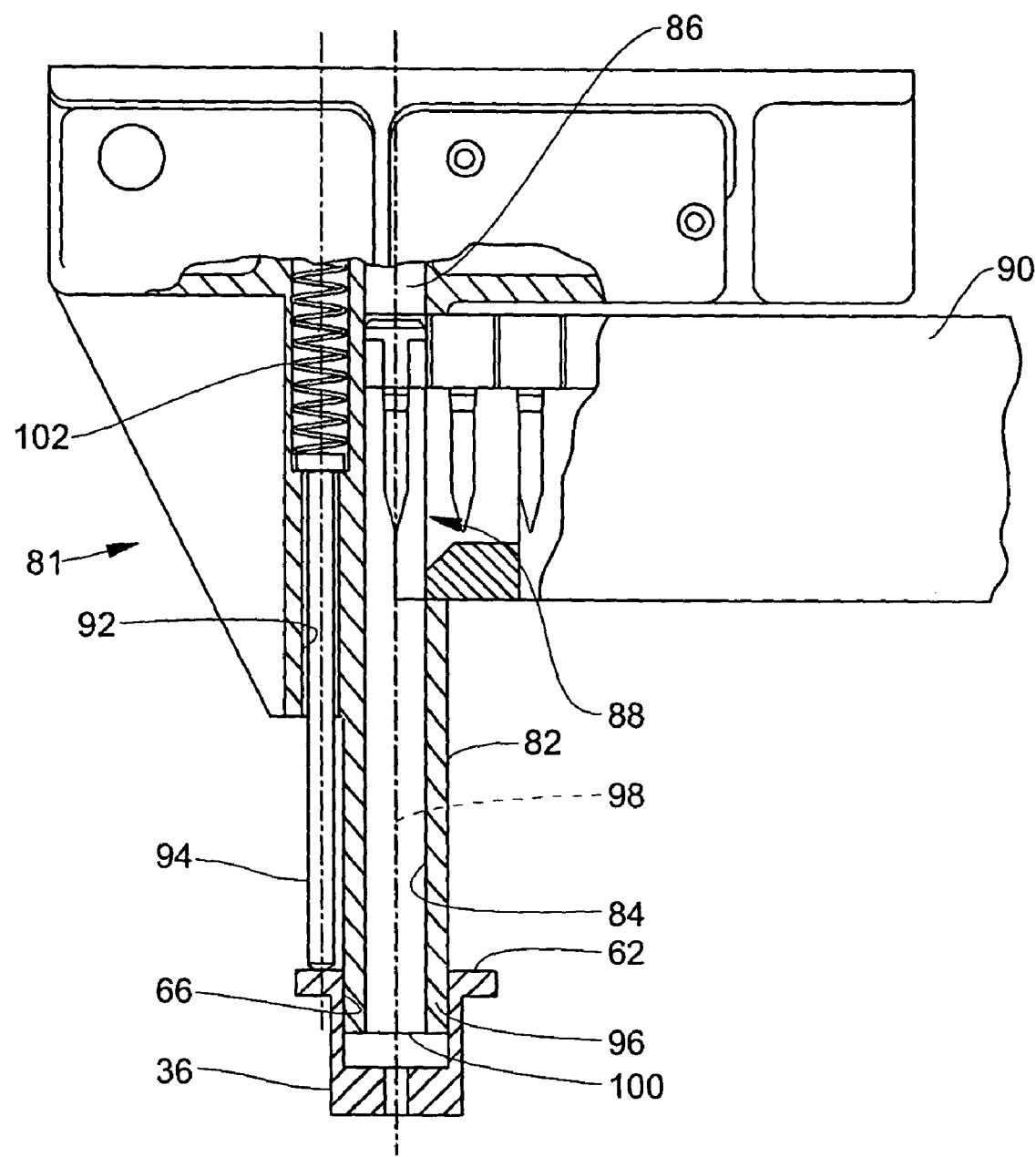
FIG. 7 is a side elevational, partly sectional, partly broken-away view of a modified form of the nozzle for the driving tool of FIG. 6 as adapted for use in practicing the invention.

Referring to FIGS. 7 and 8, for the purposes of this invention the powered driver, e.g., a Pneutek Model PT 1100, is provided with a modified form of bottom member 81 wherein the nozzle 82 has a bottom end section 96 characterized by a cylindrical outer surface terminating in an annular end face 100. The cylindrical section 96 has an outside diameter that is smaller than the diameter of the counterbores 66 of sleeves 34, so as to permit it to be inserted into those counterbores. However, the outside diameter of bottom end section 96 is not so large as to introduce a degree of lateral play that makes it difficult to center the nozzle in counterbores 66, since in the manual mode an off-center nozzle may result in the hammer 86 striking the head of the pre-positioned fastener off center; and in the automatic mode an off-center nozzle may result in the fastener being misaligned with the sleeve center hole 60, both situations being undesirable for obvious reasons. Preferably, the outside diameter of the bottom end section 96 of the nozzle 82 is about 0.015 to 0.036 inch less than the diameter of the counterbores 66. The driver nozzle bore 84 is coaxial with the center axis 98 of the nozzle's circular and annular end face 100 and has a diameter that exceeds the diameter of the fastener head by a small amount, so as to readily accommodate the fastener head 40. Preferably the bore 84 diameter exceeds the maximum diameter of the fastener head 40 by about 0.015 to 0.021 inch.

A bore 92 for safety rod 94 is formed in the upper section of nozzle 82 eccentric to the bottom end section 96, so that the safety rod extends down along side of and close to the cylindrical outer surface of nozzle bottom section 96, whereby the outer or bottom end of the rod can engage the flange 62 of a sleeve 34 into which the nozzle is inserted. Rod 94 is biased outwardly by a spring 102. In its normal at-rest (extended) position under the influence of spring 102, the outer or bottom end of rod 94 does not project beyond the end face 100, but instead it is located short of that end face so that nozzle end section 96 may be inserted into counterbore 66 of a pre-positioned sleeve 34 before the safety rod can engage the flange 62 of that sleeve. Additionally the relationship between the end face 100 of the nozzle and the end of safety rod 94 is such that when the rod engages flange 62, the end face 100 will be spaced from the bottom end wall 59 of the counterbore 66 by a distance substantially equal to or less than the distance that the safety rod needs to be retracted in order to place the driver in condition for firing. By way of example but not limitation, if the depth of counterbore 66 is 0.88 inch and the safety rod needs to be retracted 0.25 inch in order to place the driver in condition for firing, in its normal at rest position the outer end of safety rod 94 may be 0.50 inch behind end face 100.

In the automatic mode, the sleeves are pre-positioned in the holes 32 of a sleeper, and the driver has a magazine 90 (FIG. 7) that carries a strip of fasteners 34. The driver is then inserted into a pre-positioned sleeve and then fired, where-upon a fastener is driven through the sleeve hole 60 into the substrate or base 28, with the fastener and sleeve being in the anchored relationship shown in FIG. 9. In the manual mode of operation, each sleeve is pre-positioned with a fastener inserted therein, in the manner shown in FIG. 5, and then the driver nozzle is inserted into the sleeve counter bore 66 with the fastener extending up into the hammer bore 84, after which the driver is fired to cause the fastener to be driven into the base 28 as shown in FIG. 9.

When a sleeve 36 is inserted into a hole 32 in a sleeper 20 or other member of like purpose, the bottom end of the sleeve will engage or be in near engagement with the base 28. When subsequently the bottom end section 96 of driver nozzle 82 is inserted into the sleeve counterbore 66, the spring-biased safety rod 94 will engage the sleeve flange 62. The spring 102 acts on rod 94 to resist intrusion of the nozzle into the sleeve. Preferably the stiffness of spring 102 is such that the driver needs to be pushed down against the plastic sleeve flange 62 with moderate manual force in order to depress the safety rod 94 far enough to place the driver in condition for firing.

In both the automatic and manual modes of operation, the sleeves are pre-positioned in the sleeper holes 32. It is preferred that when a sleeve is inserted into a sleeper hole 32, the bottom end 68 of the sleeve 36 will touch the upper surface 72 of the base 28 and the bottom side of the sleeve flange 62 will engage, or nearly engage, the surface 46 of the sleeper center bore 44. In both modes the driver nozzle is inserted into the counterbore 66 of a pre-positioned sleeve and the safety rod engages the flange 62 of that pre-positioned sleeve. In the manual mode the head 40 of the fastener extends up into the nozzle bore 84. In the automatic mode, a fastener 34 fed from the magazine 90 is pre-positioned in hammer bore 84, and when the driver is fired its hammer 86 impacts that pre-positioned fastener and drives it down along bore 84 into the pre-positioned sleeve.

In both modes, when the driver is fired, the hammer 86 of the driver impacts the head 40 of the fastener at a high velocity and with great force, causing the fastener to penetrate the underlying hard and dense base 28, whereby the fastener and the surrounding sleeve serve to position and anchor the sleeper to the base. The hammer 86 of the driver forces the fastener 34 into the concrete base 28 far enough to cause the fastener head 40 to be seated against the bottom wall 59 of counterbore 66 and to lock the sleeve 36 tight against the base 28. However, because of the depth-limiting action of the sleeve 36 with respect to the sleeper, the fastener 34 cannot be driven into the concrete so far as to precompress the resilient pads 26. Further assurance that the fasteners are driven into the concrete the correct amount is provided by the fact that the stroke of the hammer 86 is limited. The limited stroke of the hammer also substantially eliminates any possibility that the hammer will crush the sleeve.

With the foregoing apparatus, anchoring of floor systems of the type described in U.S. Pat. No. RE37,615 is greatly facilitated. The automatic mode using a magazine type driver is preferred over the manual mode not only because of time saving and convenience, but because the manual mode requires a higher air pressure supply for the driver tool than does the magazine type. That is because In the magazine type the mass of the fastener (pre-positioned in the hammer bore by action of the magazine) is effectively added to the mass of the hammer during the driving action, providing a more forceful impact for a given air pressure supply.

Referring to FIG. 10, it will be seen that the fastener may be provided with a smaller head 40 and a washer 58 placed inside the counterbore 66 of the plastic sleeve 36 and in engagement with a bottom end wall 59. The washer 58 is engaged by the fastener head 40 when the fastener 34 is driven into the base 28. The washer 58 effectively increases the diameter of the fastener head 40, assuring adequate bearing area for locking the sleeve 36 to the base 28.

Figure 11:
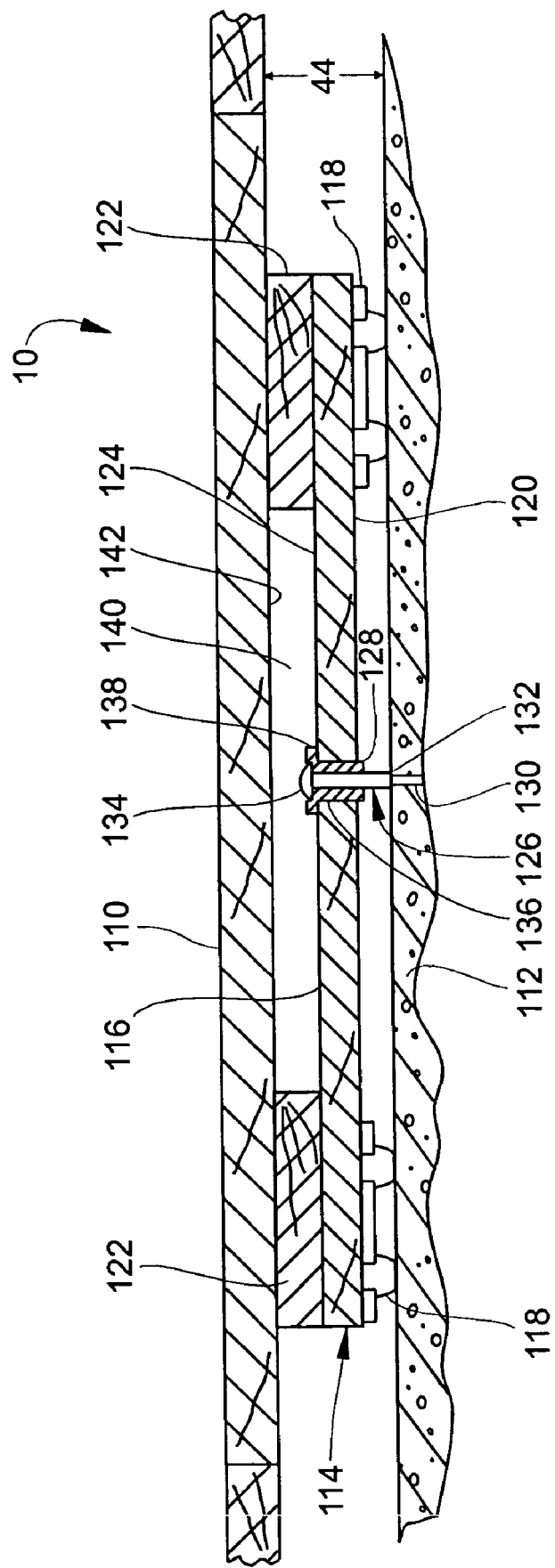
FIG. 11 is a sectional view illustrating another known type of floor system with which the invention may be used.

The invention is not limited in its application to floor systems of the type wherein the floor attachment members are in the form of nailing strips, or sleepers, that carry the resilient pads. For example, the invention also is applicable to a wood floor system of the type disclosed in U.S. Pat. No. 6,367,217, issued Apr. 9, 2002 to Michael W. Niese et al. for "Sleeper Assembly For Resilient Hardwood Floor System". FIG. 11 illustrates that system. In this case, the system comprises an upper floor wear surface in the form of a plurality of interlocked floorboards 110 supported in spaced relation to the dense supporting base 112 by spaced rows of substructure assemblies 114. Each substructure assembly 114 comprises an elongated panel 116, a pair of spaced rows of compressible pads 118 attached to the bottom surface 120 of the panel 116 adjacent its opposite edges, and a corresponding pair of rows of nailing strips 122 secured to the top surface 124 of the panel 116 above the rows of pads 118. The floorboards 110 are nailed to the substructure assemblies 114 and the latter are secured to the base 112 by fasteners 126 that pass through holes 128 in the panels 116 and are secured in holes 130 in base 112. Each fastener 126 is provided with a shoulder 132 intermediate its opposite ends that functions as a depth stop to limit the depth of fastener penetration into the base 112, and thereby prevents precompression of the pads 118 by the downward driving forces applied by the fasteners as they are driven into the base, with pre-drilled holes being required in the case of a concrete base. A lubricating sleeve 136 is disposed in each of the holes 128 in the panel 46 in surrounding relation to a fastener and has a flange 138 that overlies the panel 116. A head 134 of the fastener 126 is seated against the flange 138. The sleeves 136 project down through the panel 116 only a limited distance and do not contact the base 112 when the fastener is driven into the base to the extent allowed by depth stop 132. The nailing strips 122 provide an air space 140 between the upper surface 124 of the panel 116 and a lower surface 142 of floorboards 110.

Figure 12:
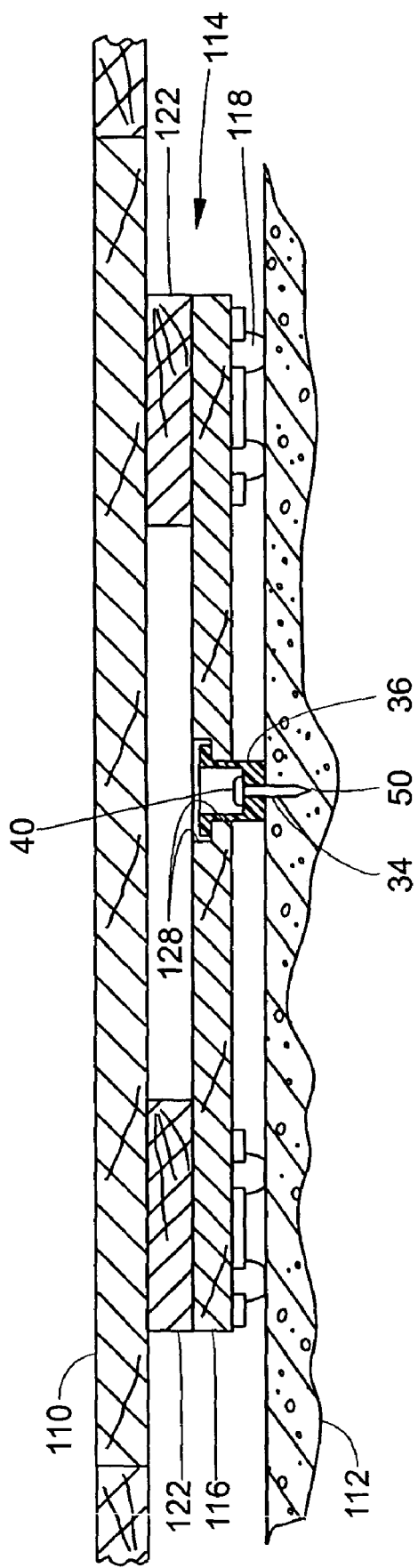
FIG. 12 is similar to FIG. 11, but illustrative of the present invention applied to the floor system of FIG. 11.

Since substructure assemblies 114 of the type shown in U.S. Pat. No. 6,367,217 are installed first before the floorboards 110 are nailed in place, the present invention makes it possible to anchor the substructure assemblies 114 to the hard concrete base 112 without any need for predrilling holes in the base. Referring to FIG. 12, this is accomplished by replacing fasteners 126 and lubrication sleeves 136 with the fasteners 34 and sleeves 36 illustrated in FIGS. 4, 5 and 12, with the lengths of the fasteners and sleeves being adjusted to allow the sleeves 36 to function as depth stops and the fasteners to penetrate the base 112 to a depth sufficient to assure that the heads 40 of the fasteners force the sleeves into tight engagement with the base without precompressing the resilient pads 112. As with the application of the invention to the sleeper type construction shown in FIG. 1, the sleeves 36 and the holes 128 in each panel 116 (FIG. 12) are sized so as to provide a clearance of approximately 0.040 to 0.060 inch. In both types of floor constructions, the reason for such clearance is to prevent floor squeaking as the floor is subjected to loading and unloading forces. The holes 128 may be provided with countersinks as shown in FIG. 12 to accommodate the flanges of sleeves 34.

Alternatively, the holes need not have countersinks, in which case the flanges may extend over and engage the upper surface of the panels 116 in the manner shown in FIG. 3 of U.S. Pat. No. 6,367,217, cited supra.

Although it is preferred to use fasteners with step-down shanks 48 as shown in FIGS. 4 and 5, the invention may be practiced with fasteners that have straight shanks, e.g., a shank having a substantially constant diameter except for the pointed tip 50, as shown in FIG. 12. In such case, it is preferred that at least for the manual mode of operation, the shank diameter be the same as that of bore 60 so that the shank makes a tight fit in and is gripped by the sleeve and that its length of the fastener be such that its head protrudes above the flange 64, in the manner shown in FIG. 5. Further with respect to the embodiment of FIG. 12, in the manual mode, when the fastener and sleeve are pre-assembled, it is preferred that the pointed tip of the fastener be substantially even with the bottom end of the sleeve. Of course, the shank diameter may be slightly smaller than sleeve bore 60, in which case the sleeve 36 may be inserted in the sleeper hole 32 first, and then the fastener may be inserted into the sleeve bore 60 with the tip 50 thereof engaging the underlying base 28 or 112.

As used herein in relation to the resilient support pads 26,118, the terms "precompressing" and "precompression" are synonymous with "preloading" and are intended to embrace the situation where the pads are essentially not compressed at all by the fasteners, and also the situation where the pads are compressed somewhat as a consequence of the fastening operation, but are still capable of further compression to the extent required to allow the floor system to deflect downwardly when impacted within the operating limits contemplated by the parameters of the system. In this context, it is recognized that the support pads 26 and 118 are compressed by the weight of the floor components, and such compression is not to be construed as coming within the scope of the term "precompression".

The advantages of the invention are obvious and significant. No predrilling of the concrete base is required in order to anchor floor systems with fasteners. Furthermore, the invention eliminates the need to use fasteners characterized by a shoulder that functions as a depth stop and fasteners having expansion curves for locking them in pre-drilled holes in a concrete base. The driving of the fasteners is rapid, with the manual labor limited to inserting the sleeves and fasteners in holes in the wooden attachment strips, and positioning and firing the driver. Additionally, pneumatic drivers of the type described herein are reliable and easy to use, and the nozzle 82, as shown in FIGS. 6-8, is capable of withstanding wear and tear encountered in the field. Overall, the invention provides a tremendous saving of cost and time while providing anchor strengths far in excess of what has been achieved heretofore in the installation of hardwood floor systems on concrete slabs. Still other advantages will be evident to persons skilled in the art. Moreover, those skilled in the art will readily comprehend the various modifications to which the invention is susceptible.

What is claimed is:

1. Method for anchoring to a concrete base a floor attachment assembly that comprises a floor attachment member having top and bottom sides, at least two compressible pads attached to the bottom side of said floor attachment member, and two holes extending through said attachment member, said method comprising the following steps:
    (1) providing a fastener and sleeve assembly that includes a fastener having a shank with a leading end and a trailing end and a radially-projecting head at said trailing end, and a sleeve having a bottom end and a top end, a radially projecting flange at said top end, an axial bore, and a counterbore for said axial bore at said top end, with said leading end of said shank intruding into said axial bore via said counterbore;
    (2) inserting said fastener and sleeve assembly into one of said holes with said bottom end of said sleeve projecting below the bottom side of said attachment member and with the head of said fastener disposed above and spaced from the top side of said attachment member;
    (3) providing a pneumatically powered tool having a nozzle, a hammer bore in said nozzle, and a hammer mounted for reciprocal movement in said hammer bore;
    (4) inserting said nozzle in said counterbore so that the head of said fastener intrudes into said hammer bore; and
    (5) operating said tool so that said hammer impacts said fastener head with sufficient force to drive said fastener into said concrete base far enough to cause the head of said fastener to (a) force said flange into tight engagement with said attachment member and (b) anchor said attachment member to said base without compressing said pads.

2. Method according to claim 1 wherein in step (1) the head of said fastener extends above said attachment member.

3. Method according to claim 1 wherein in step (5) the depth of penetration of said fastener into said base is limited by said sleeve.

4. Method for anchoring to a concrete base a floor attachment assembly that comprises a floor attachment member having top and bottom sides, at least two compressible pads attached to the bottom side of said floor attachment member, and two holes extending through said attachment member, said method comprising the following steps:
    (1) providing a sleeve having a bottom end and a top end, a radially projecting flange at said top end, an axial bore, and a counterbore for said axial bore at said top end,
    (2) providing a manually operable pneumatic driver having a nozzle member comprising an elongate nozzle having an end section with an end surface that is sized to fit in said counterbore, a striker bore in said nozzle extending for the length of said nozzle, a side opening in said nozzle leading to said striker bore, a striker mounted for axial movement in said striker bore, means for reciprocally driving said striker through (a) a rapid drive stroke whereby said striker is moved from an at-rest position in which the striker is withdrawn into said bore to an extended fastener-driving position in which said striker projects beyond said end surface and (b) a rapid return stroke whereby the striker is withdrawn from said fastener-driving position back to said at-rest position; a magazine for holding a plurality of fasteners each characterized by a shank and a flanged head, and means for feeding fasteners into said striker bore via said side opening when said nozzle is in said at-rest position,
    (3) inserting said sleeve into one of said holes with its said flange overlying the top side of said attachment member;
    (4) inserting said nozzle in said counterbore so that said striker bore is coaxial with said axial bore;
    (5) operating said tool so that said striker impacts the head of a fastener positioned in said striker bore with sufficient force to drive said fastener so that its shank passes through said axial bore and penetrates said concrete base far enough to cause the head of said fastener to (a)

force said flange into tight engagement with said attachment member and (b) anchor said attachment member to said base without compressing said pads.

5. Method according to claim 4 wherein said end section of said nozzle has a cylindrical outer surface.

6. Method according to claim 4 wherein said end section of said nozzle is sized to make a close fit with said counterbore.

7. Method according to claim 4 wherein in step (5) the depth of penetration of said fastener into said base is limited by said sleeve.

8. Method according to claim 4 wherein when said sleeve is inserted into said hole, the bottom end of said sleeve projects below said attachment member by a predetermined amount so that it is substantially flush with the bottom side of said each compressible pad.

9. Method according to claim 4 wherein in step (5) the depth of penetration of said fastener into said base is limited by said sleeve.

10. Method according to claim 4 wherein the heads of said fasteners are sized to make a close sliding fit in said striker bore.

* * * * *